(12) United States Patent
Sasaoka

(10) Patent No.: US 11,318,992 B2
(45) Date of Patent: May 3, 2022

(54) VEHICLE LOWER STRUCTURE

(71) Applicant: Toyota Jidosha Kabushiki Kaisha, Toyota (JP)

(72) Inventor: Hiroyuki Sasaoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 16/983,266

(22) Filed: Aug. 3, 2020

(65) Prior Publication Data

US 2021/0039716 A1 Feb. 11, 2021

(30) Foreign Application Priority Data

Aug. 5, 2019 (JP) .............................. JP2019-143510
Jul. 2, 2020 (JP) .............................. JP2020-114671

(51) Int. Cl.
| | | |
|---|---|---|
| *B60J 7/00* | (2006.01) | |
| *B62D 21/03* | (2006.01) | |
| *B62D 25/02* | (2006.01) | |
| *B62D 27/06* | (2006.01) | |
| *B62D 21/15* | (2006.01) | |
| *B60K 1/04* | (2019.01) | |

(52) U.S. Cl.
CPC ................ *B62D 21/03* (2013.01); *B60K 1/04* (2013.01); *B62D 21/157* (2013.01); *B62D 25/025* (2013.01); *B62D 27/065* (2013.01); *B60K 2001/0438* (2013.01)

(58) Field of Classification Search
CPC .............. B60K 1/04; B60K 2001/0438; B62D 25/025; B62D 21/157; B62D 1/28; B60P 3/08; G07B 15/063; G01S 13/931; G01C 21/28

See application file for complete search history.

(56) References Cited

U.S. PATENT DOCUMENTS

| | | | | |
|---|---|---|---|---|
| 9,073,578 | B2 * | 7/2015 | Chikazawa | .......... B62D 21/155 |
| 2016/0137228 | A1 * | 5/2016 | Atsumi | ................. B62D 25/20 |
| | | | | 296/204 |
| 2017/0106914 | A1 * | 4/2017 | Abe | ...................... B62D 21/152 |
| 2018/0126933 | A1 * | 5/2018 | Kawase | ................... B60K 1/04 |
| 2018/0222535 | A1 * | 8/2018 | Tanabe | .................. B62D 25/025 |
| 2018/0312199 | A1 * | 11/2018 | Kawase | ............. B62D 25/2036 |
| 2018/0370570 | A1 * | 12/2018 | Ayukawa | ........... B62D 25/2036 |
| 2019/0023323 | A1 * | 1/2019 | Uehata | ............... B62D 25/2036 |
| 2019/0263276 | A1 * | 8/2019 | Otoguro | ................ B60L 50/64 |
| 2019/0276081 | A1 * | 9/2019 | Otoguro | ................. B62D 21/03 |
| 2020/0047808 | A1 * | 2/2020 | Ajisaka | ................. B62D 35/02 |

(Continued)

FOREIGN PATENT DOCUMENTS

JP 2018-193026 A 12/2018

*Primary Examiner* — Kiran B Patel
(74) *Attorney, Agent, or Firm* — Dinsmore & Shohl LLP

(57) ABSTRACT

A first body cross-member is disposed on body mounts and fixed to the body mounts through outer brackets and mount bolts that are fastening members. A battery and a cooling blower that is a battery accessory provided on an outer side of the battery in a vehicle width direction are installed on a vehicle body, between a pair of rockers. The rockers have a closed cross-sectional structure, and a brace that is a reinforcing member is housed in a battery flanking portion of each rocker that is a portion corresponding to the cooling blower in position in a vehicle front-rear direction.

4 Claims, 10 Drawing Sheets

(56) References Cited

U.S. PATENT DOCUMENTS

| | | | |
|---|---|---|---|
| 2020/0114973 A1* | 4/2020 | Takahashi | B62D 25/025 |
| 2020/0223303 A1* | 7/2020 | Saeki | B60K 1/04 |
| 2020/0262491 A1* | 8/2020 | Shannon | B62D 21/03 |
| 2021/0016831 A1* | 1/2021 | Sasaoka | B62D 21/03 |
| 2021/0061080 A1* | 3/2021 | Otoguro | B62D 21/03 |
| 2021/0245809 A1* | 8/2021 | Saje | B62D 21/03 |

\* cited by examiner

VEHICLE LOWER STRUCTURE

CROSS-REFERENCE TO RELATED APPLICATIONS

This application claims priority to Japanese Patent Application No. 2019-143510 filed on Aug. 5, 2019 and Japanese Patent Application No. 2020-114671 filed on Jul. 2, 2020, each incorporated herein by reference in its entirety.

BACKGROUND

1. Technical Field

This specification discloses a vehicle lower structure. More particularly, this specification discloses a lower structure of a body-on-frame vehicle.

2. Description of Related Art

As illustrated in FIG. 8, a body-on-frame vehicle has a vehicle body 110 installed on a ladder frame 100 that is a framework member.

The ladder frame 100 is provided with a pair of left and right side rails 102 extending in a vehicle front-rear direction. On the side rails 102, body mounts 104 for fixing the body 110 are respectively mounted.

The body 110 has, as framework members thereof, a pair of left and right rockers 112 that is provided at both ends in a vehicle width direction and extends in the vehicle front-rear direction. Referring to FIG. 9 and Japanese Patent Application Publication No. 2018-193026, for example, the rocker 112 has an inner rocker part 112A and an outer rocker part 112B, both having a hat-shaped cross-section, that are coupled together at flanges to form a closed cross-sectional structure with a polygonal cross-section.

Referring to FIG. 8, body cross-members 114, 116 extending in the vehicle width direction so as to be suspended between the rockers 112 are provided. Referring to FIG. 9, the body cross-member 114 is disposed partially on each body mount 104 and fixed to each body mount 104 with a fastening member, such as a mount bolt 106.

The rockers 112 provided at both ends in the vehicle width direction are subjected to a collision load in a side-impact collision of the vehicle. FIG. 10 illustrates a state of the vehicle lower structure in a so-called pole side-impact collision which is one aspect of side-impact collision and in which a side surface of a vehicle collides with a pole, such as a roadside utility pole.

As indicated by the arrow in FIG. 10, the rocker 112 collides with a pole 130 when the vehicle slides sideways and a side surface thereof collides with the pole 130. The resulting collision load exerted on the rocker 112 is transmitted to the body cross-member 114 that is a framework member connected to the rocker 112.

When a load directed inward in the vehicle width direction is input into the body cross-member 114, a shearing load directed perpendicular to an axial direction of the mount bolt 106 is input into the mount bolt 106. When the mount bolt 106, unable to withstand this shearing load, breaks, the ladder frame 100 and the body 110 become unfastened from each other. As a result, the inertial mass of the body 110 is reduced compared with that of the combined body of the ladder frame 100 and the body 110, so that the inertial force is reduced accordingly and the intrusion of the pole 130 into the vehicle cabin is restricted.

SUMMARY

Depending on the position of the pole in a pole side-impact collision, it is desirable in some cases to restrict the amount of intrusion of the pole into the vehicle cabin more than in the conventional structure. One example of such cases is where a battery extending in a vehicle width direction is provided in a vehicle body and, in addition, battery accessories, such as cooling blowers, are disposed on both sides of the battery. As the dimension of the battery in the vehicle width direction becomes larger, the installation spaces for the battery accessories provided on both sides thereof are further limited and, moreover, the distance from each battery accessory to the rocker becomes shorter.

When a portion of a side surface of the vehicle on a lateral side of the battery installation space collides with a pole, the short distance from the battery accessory to the rocker in this layout makes it necessary to disconnect the body from the ladder frame at an early point after the pole side-impact collision and thereby restrict the amount of intrusion of the pole into the body.

In the conventional structure, however, as illustrated in FIG. 10, the rocker 112 having a closed cross-sectional structure absorbs the collision load to some extent by undergoing crushing deformation at an early stage of a pole side-impact collision. Thus, the amount of shearing load input into the mount bolt 106 is reduced accordingly, so that the mount bolt 106 may not break until the rocker 112 becomes crushed to some extent.

An object of this specification is to provide a vehicle lower structure that can quickly disconnect a vehicle body from a ladder frame by restricting crushing deformation of a rocker in the event of a pole side-impact collision in which a portion of the vehicle on a lateral side of a battery installation space is impacted.

In a vehicle lower structure disclosed by this specification, a vehicle body is installed on a ladder frame that is a framework member. The ladder frame includes a pair of left and right side rails extending in a vehicle front-rear direction, and body mounts respectively mounted on the side rails. The body includes, as framework members, a pair of left and right rockers and a first body cross-member. The rockers are provided at both ends in a vehicle width direction, outward of the pair of side rails in the vehicle width direction, and extend in the vehicle front-rear direction. The first body cross-member extends in the vehicle width direction so as to be suspended between the pair of rockers. The first body cross-member is disposed on the body mounts and fixed to the body mounts through fastening members. A battery and a battery accessory provided on the outer side of the battery in the vehicle width direction are installed on the body, between the pair of rockers. The rockers have a closed cross-sectional structure, and a brace that is a reinforcing member is housed in a battery flanking portion of each of the rockers that is a portion corresponding to the battery accessory in position in the vehicle front-rear direction.

Having the brace housed in the battery flanking portion of the rocker, this configuration can restrict crushing deformation of the rocker upon collision of that portion with a pole. As the collision load is transmitted from the rocker to the first body cross-member with load absorption through crushing deformation thus restricted, relative displacement between the body and the frame occurs on the side opposite from the impacted side, which allows the fastening member fastening together the first body cross-member and the body mount to break quickly.

In the above configuration, the length of the brace in the vehicle front-rear direction may be equal to or shorter than the length of the battery accessory in the vehicle front-rear direction.

If the brace has such a size and shape as to be contained in the battery flanking portion of the rocker, portions of the rocker other than the battery flanking portion can undergo crushing deformation in a side-impact collision and the collision load is absorbed through the crushing deformation.

In the above configuration, a reference point for positioning the brace may be provided in the battery flanking portion of the rocker.

This configuration allows the brace to be reliably positioned in the battery flanking portion of the rocker.

In the above configuration, the body may have, in addition to the first body cross-member fixed to the body mounts, a second body cross-member that is provided frontward of the first body cross-member and extends in the vehicle width direction so as to be suspended between the pair of rockers. In this case, the battery and the battery accessory may be disposed closer to the first body cross-member than to the second body cross-member.

In this configuration, when the battery flanking portion of the rocker collides with a pole, a larger collision load is transmitted to the first body cross-member than to the second body cross-member. As a result, breakage of the fastening member fastened to the first body cross-member is facilitated.

The vehicle lower structure disclosed in this specification can quickly disconnect the vehicle body from the ladder frame by restricting crushing of the rocker in the event of a pole side-impact collision in which a portion of the vehicle on the lateral side of the battery installation space is impacted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicle lower structure according to an embodiment will be described below with reference to the drawings. In FIG. 1 to FIG. 7, a vehicle front-rear direction, a vehicle width direction, and a vehicle height direction are represented by axes denoted by reference signs FR, RH (right hand), and UP, respectively. The vehicle front-rear axis FR has a vehicle frontward direction as a positive direction. The vehicle width axis RH has a rightward direction in the vehicle width direction as a positive direction. The vehicle height axis UP has an upward direction as a positive direction. These three axes are orthogonal to one another.

Except where a special explanatory note is required, a front side in the vehicle front-rear direction and a rear side in the vehicle front-rear direction will be hereinafter simply written as a front side and a rear side, respectively. Likewise, an upper side in the vehicle height direction and a lower side in the vehicle height direction will be simply written as an upper side and a lower side, respectively.

Figure 1:
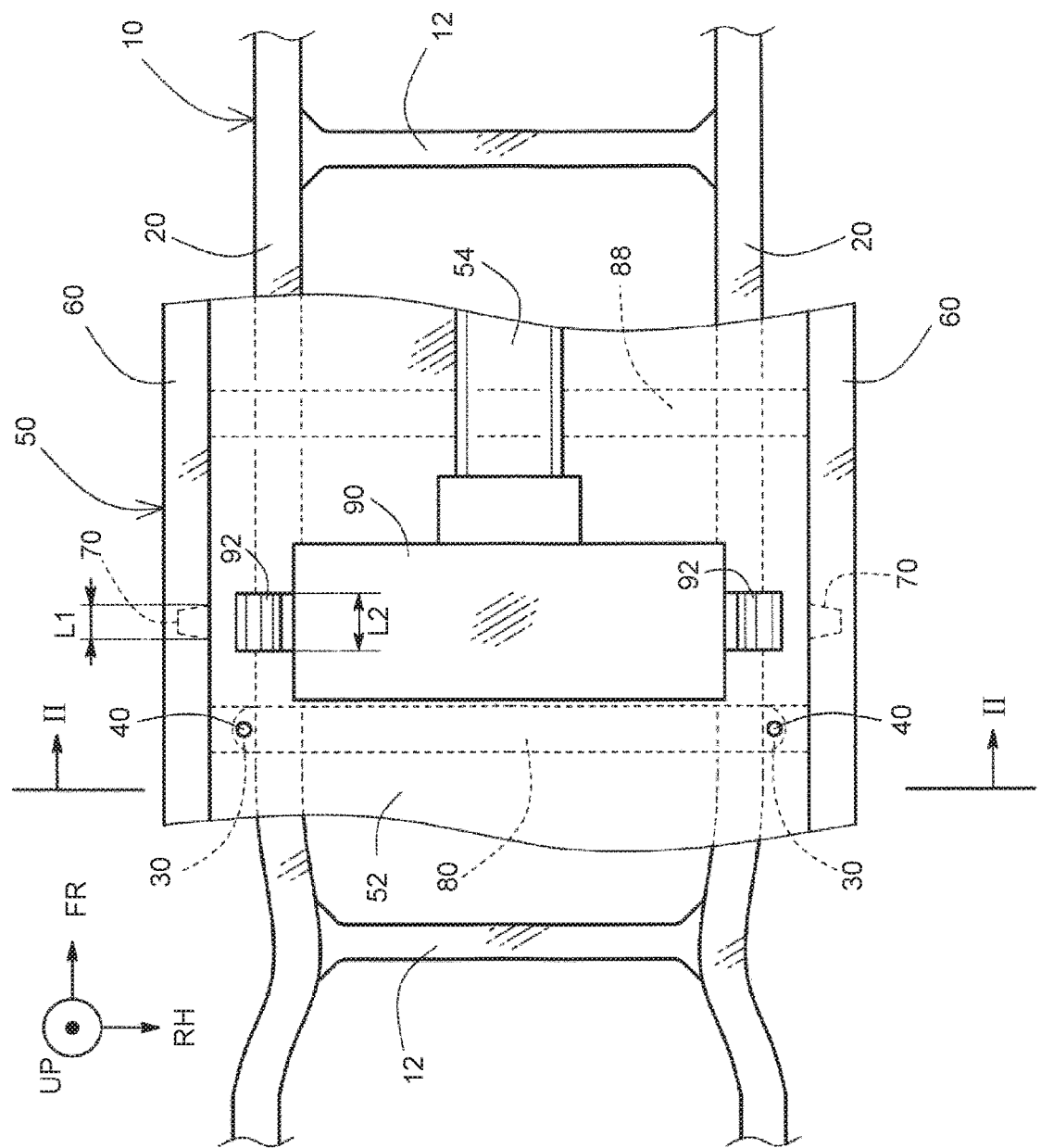
FIG. 1 is a plan view illustrating a vehicle lower structure according to an embodiment.

FIG. 1 is a plan view illustrating the vehicle lower structure according to the embodiment. To clarify the positional relationship between a ladder frame 10 and a body 50, only a part of the body 50 is shown while front and rear parts thereof are omitted.

This vehicle is a so-called body-on-frame vehicle and has the body 50 fixed on the ladder frame 10 that is a framework member. The ladder frame 10 is a ladder-shaped framework member and includes a frame cross-member 12 and side rails 20.

The side rails 20 extend in the vehicle front-rear direction, and are provided as a pair on left and right sides, in other words, side by side in the vehicle width direction. The frame cross-member 12 extends in the vehicle width direction so as to be suspended between the pair of side rails 20.

Figure 2:
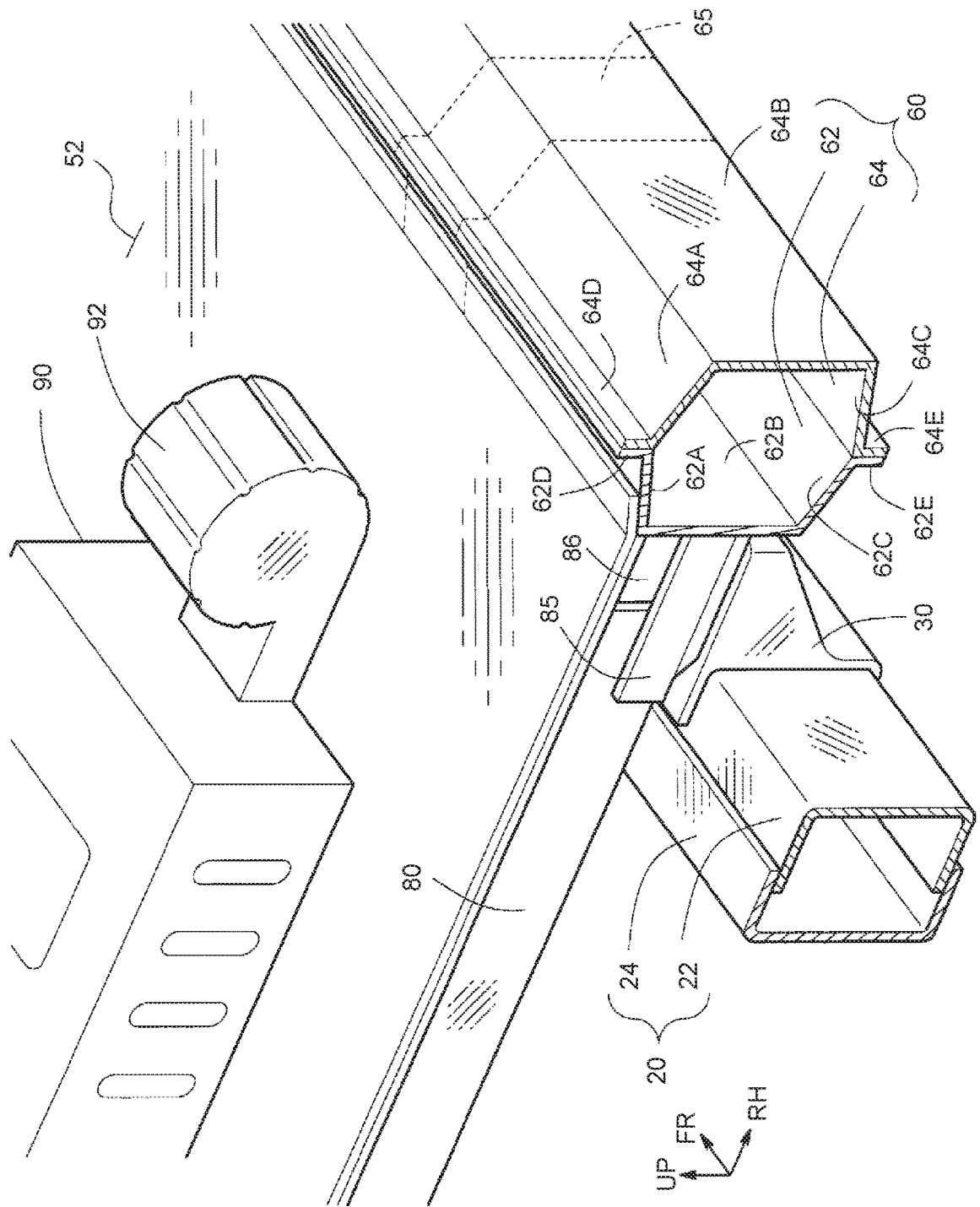
FIG. 2 is a perspective view illustrating section II-II of FIG. 1.

FIG. 2 is a perspective view illustrating a vehicle right-side part, taken along section II-II of FIG. 1. Since the vehicle has a symmetrical structure, the structure of a vehicle left-side part is a mirror image of FIG. 2 with respect to the UP axis. The side rail 20 includes an outer side rail part 22 that is an outer member in the vehicle width direction and an inner side rail part 24 that is an inner member in the vehicle width direction. Both the outer side rail part 22 and the inner side rail part 24 have, for example, a U-shaped cross-section, and are overlapped with each other to form a closed cross-sectional structure.

Figure 4:
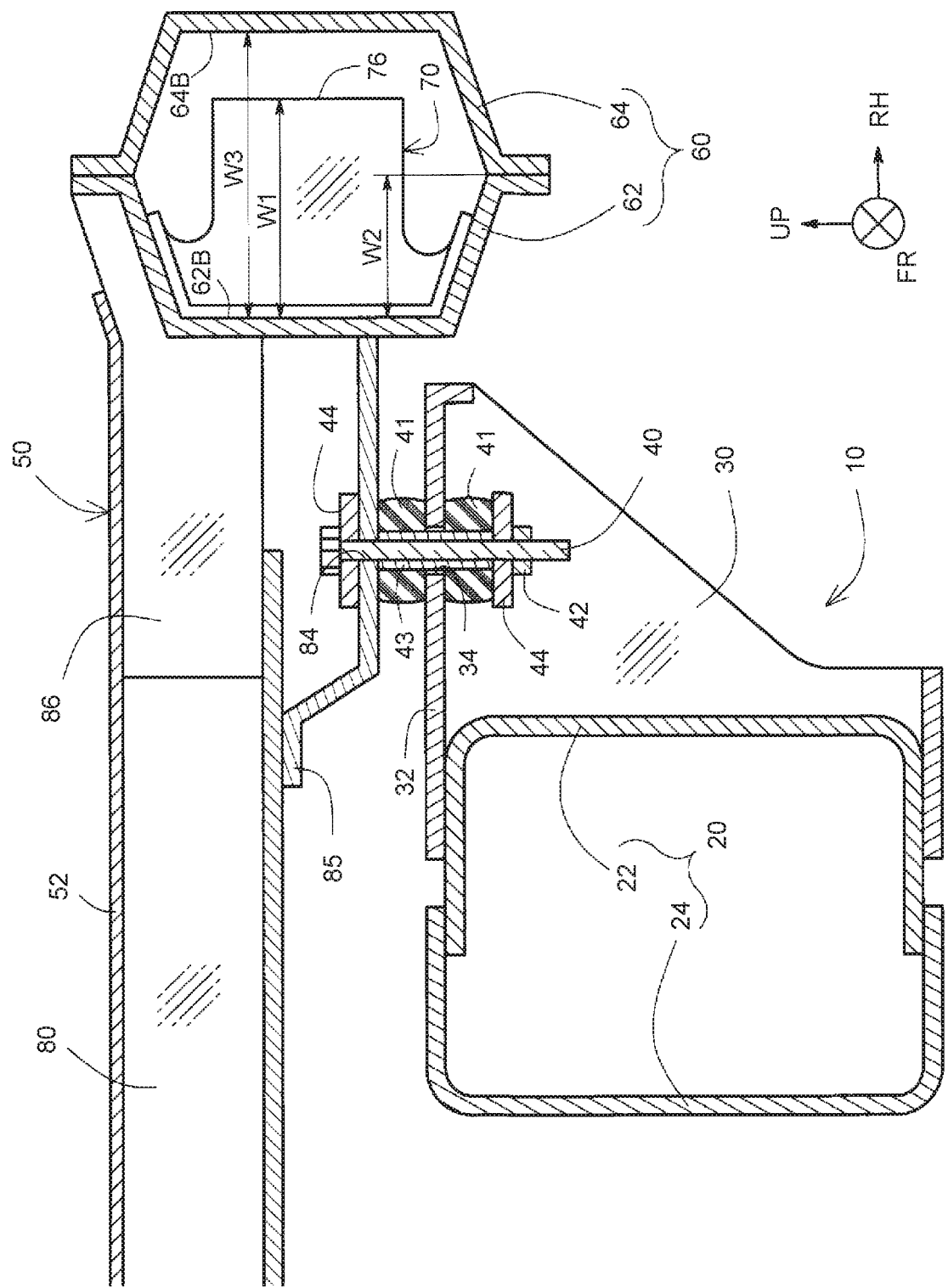
FIG. 4 is a rear sectional view illustrating section IV-IV of FIG. 3.

A body mount 30 is mounted on the side rail 20. For example, the body mount 30 is welded to the outer side rail part 22 and configured to project outward in the vehicle width direction from the outer side rail part 22. As illustrated in FIG. 4, a ceiling wall 32 of the body mount 30 is extended outward in the vehicle width direction from the outer side rail part 22. A through-hole 34 is bored in the ceiling wall 32 in a thickness direction thereof. A mount bolt 40 is inserted into the through-hole 34. This mount structure will be described later.

Referring to FIG. 1, the body 50 includes, as framework members, a pair of rockers 60, a first body cross-member 80, and a second body cross-member 88. The body 50 is further provided with a floor panel 52 as a floorboard member. A battery 90 and cooling blowers 92 that are battery accessories are installed on the floor panel 52 through brackets (not shown).

The pair of rockers 60 are extended in the vehicle front-rear direction and provided as a pair on the left and right sides, i.e., side by side in the vehicle width direction. Referring to FIG. 1, the rockers 60 are provided outward of the side rails 20 in the vehicle width direction. The rockers 60 are provided, for example, at both ends of the vehicle in the vehicle width direction, and thus these are framework members that are the first to be subjected to a collision load in a side-impact collision (side collision) of the vehicle.

Referring to FIG. 2, the rocker 60 includes, for example, an inner rocker part 62 that is an inner member in the vehicle width direction and an outer rocker part 64 that is an outer member in the vehicle width direction. Both the inner rocker part 62 and the outer rocker part 64 have a hat-shaped cross-section, and have flanges 62D, 64D and flanges 62E, 64E, corresponding to the brims of the hats, joined together by welding or the like to form a closed cross-sectional structure with a polygonal cross-section. The inner rocker part 62 includes a side wall 62B, an upper wall 62A, and a lower wall 62C. The upper wall 62A connects the side wall 62B to the flange 62D, and the lower wall 62C connects the side wall 62B to the flange 62E. The outer rocker part 64 includes a side wall 64B, an upper wall 64A, and a lower wall 64C. The upper wall 64A connects the side wall 64B to the flange 64D, and the lower wall 64C connects the side wall 64B to the flange 64E. As will be described later, a brace 70 (see FIG. 6) is housed inside the rocker 60 having this closed cross-sectional structure.

Referring to FIG. 1, the first body cross-member 80 and the second body cross-member 88 are extended in the vehicle width direction so as to be suspended between the pair of rockers 60. For example, the second body cross-member 88 is provided frontward of the first body cross-member 80. As illustrated in FIG. 2, the first body cross-member 80 is extended in the vehicle width direction and terminates at each side just before reaching the rocker 60. The first body cross-member 80 and each rocker 60 are connected to each other through an outer bracket 85 and an inner bracket 86. The outer bracket 85 and the inner bracket 86 are joined to an end of the first body cross-member 80 in the vehicle width direction. The outer bracket 85 and the inner bracket 86 are extended in the vehicle width direction, with their ends on an inner side in the vehicle width direction connected to the first body cross-member 80 and their ends on an outer side in the vehicle width direction connected to the rocker 60. The outer bracket 85 has a hat-shaped cross-section that is slightly larger than that of the first body cross-member 80, and is joined to an outer side of the first body cross-member 80 by welding or the like. As will be described later, a through-hole 84 (see FIG. 4) is bored in a bottom wall of the outer bracket 85 in a thickness direction thereof. The mount bolt 40 is inserted into the through-hole 84. The inner bracket 86 is joined to an inner side of the first body cross-member 80 by welding or the like.

Figure 3:
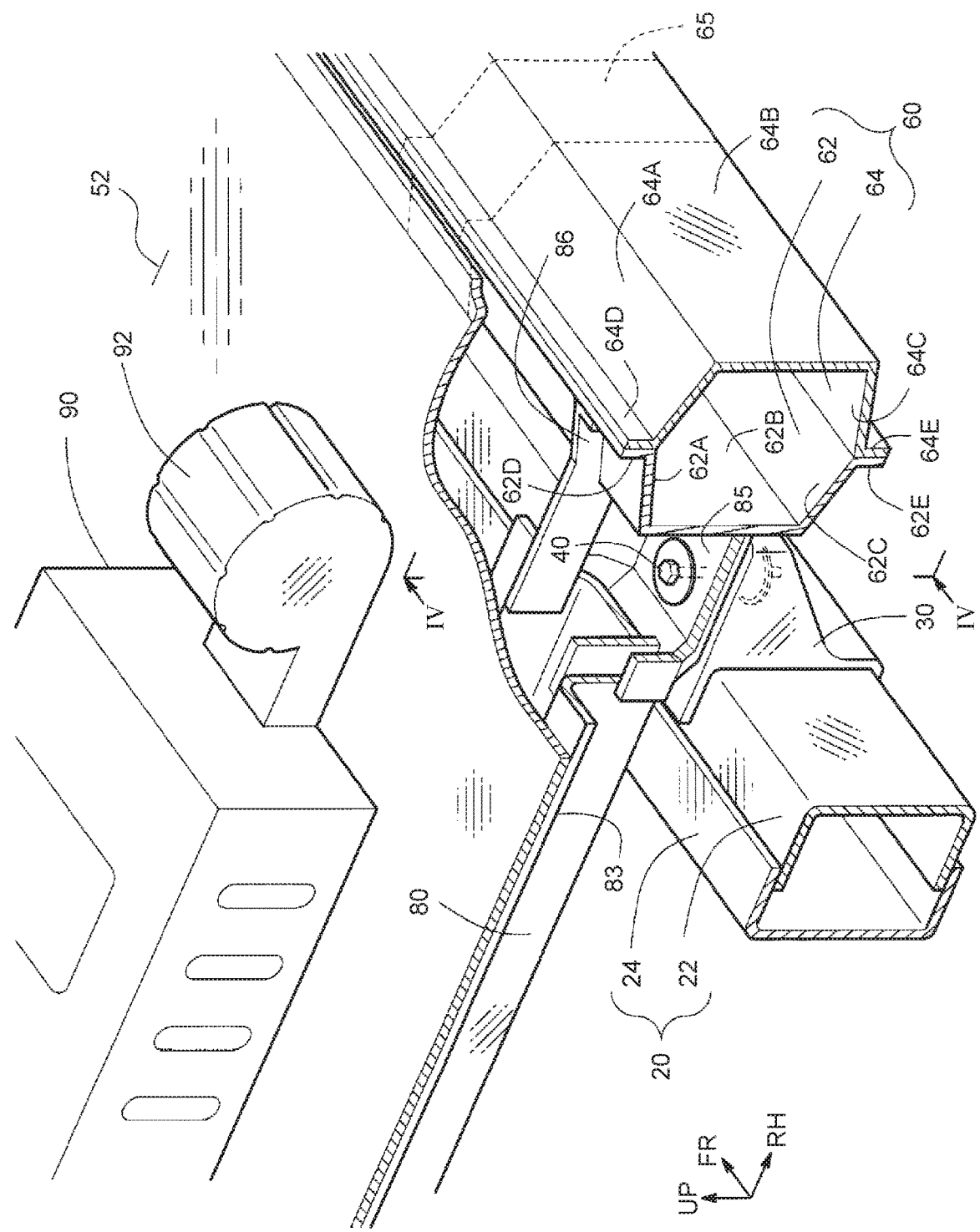
FIG. 3 is a perspective view illustrating cross-sections of parts of a floor panel and a first body cross-member.

Referring to FIG. 3, the first body cross-member 80 has, for example, a hat-shaped cross-section, and in a state where the hat-shaped cross-section is turned upside down, a flange 83, corresponding to the brim of the hat, is joined to the floor panel 52 by welding or the like. Thus, a closed cross-sectional structure is formed.

Referring to FIG. 1 and FIG. 2, the floor panel 52 that is a floorboard panel is provided on the first body cross-member 80 and the second body cross-member 88, between the rockers 60, through brackets (not shown). Further, the battery 90 and the cooling blowers 92 that are battery accessories are disposed on the floor panel 52, between the rockers 60. The battery 90 and the cooling blowers 92 are provided, for example, rearward of a floor tunnel 54, under a rear seat of the vehicle.

When the vehicle is a hybrid vehicle or an electric vehicle that includes a rotating electrical machine as a driving source, the battery 90 serves as a power source for the rotating electrical machine. The battery 90 includes a stack formed by stacking a plurality of single cells. The single cells may be, for example, lithium-ion secondary batteries or nickel-metal hydride secondary batteries, or may be all-solid-state batteries.

To secure a sufficient electric mileage (range) of the vehicle, the battery 90 has a large capacity with a plurality of single cells stacked therein. For example, the battery 90 has a substantially rectangular parallelepiped shape elongated in the vehicle width direction and extends across the side rails 20.

The cooling blowers 92 are accessories of the battery 90 and send cooling air into the battery 90. Each cooling blower 92 includes, for example, a sirocco fan and a motor that drives the sirocco fan to rotate. The cooling blowers 92 are provided on the outer sides of the battery 90 in the vehicle width direction. For example, referring to FIG. 1, outer ends of the cooling blowers 92 in the vehicle width direction are disposed outward of the side rails 20 in the vehicle width direction.

The battery 90 and the cooling blowers 92 are disposed closer to the first body cross-member 80 than to the second body cross-member 88. As will be described later, when a portion of the vehicle on a lateral side of the battery 90 collides with a pole 96 (see FIG. 7), a larger collision load is transmitted from the rocker 60 to the first body cross-member 80 than to the second body cross-member 88.

Mount Structure

FIG. 3 and FIG. 4 illustrate the structure for mounting the body 50 onto the ladder frame 10 in the vehicle lower structure according to the embodiment. The first body cross-member 80 is disposed partially on the body mount 30 and fixed to the body mount 30 through the outer bracket 85 and the mount bolt 40 that are fastening members.

More specifically, the through-hole 84 provided in the bottom wall of the outer bracket 85 and the through-hole 34 provided in the ceiling wall 32 of the body mount 30 are aligned with each other. A mount rubber 41 is provided between the bottom wall of the outer bracket 85 and the ceiling wall 32 of the body mount 30. Another mount rubber 41 is provided between the ceiling wall 32 of the body mount 30 and a washer 44 below the ceiling wall 32. A through-hole is provided at the center of each mount rubber 41 so as to extend therethrough in a thickness direction, and the through-holes of the mount rubbers 41 are aligned with the through-hole 84 of the outer bracket 85 and the through-hole 34 of the body mount 30. A collar 43 is inserted into the mount rubbers 41 and the through-hole 34 of the body mount 30.

Further, the mount bolt 40 is inserted into the through-hole 84 of the outer bracket 85 and the collar 43. A nut 42 is fastened to a lower end of the mount bolt 40. The body 50 is fixed to the ladder frame 10 by this fastening structure.

As will be described later, a collision load is transmitted from the rocker 60 to the first body cross-member 80 in a pole side-impact collision of the vehicle. Further, in the first body cross-member 80, a shearing load directed in the vehicle width direction, i.e., directed orthogonal to an axial direction of the mount bolt 40 that constitutes a fastening member, is input into the mount bolt 40. The mount bolt 40, unable to withstand this shearing load, breaks on the side opposite from the impacted side, so that the body 50 is disconnected from the ladder frame 10.

Brace Inside Rocker

Figure 5:
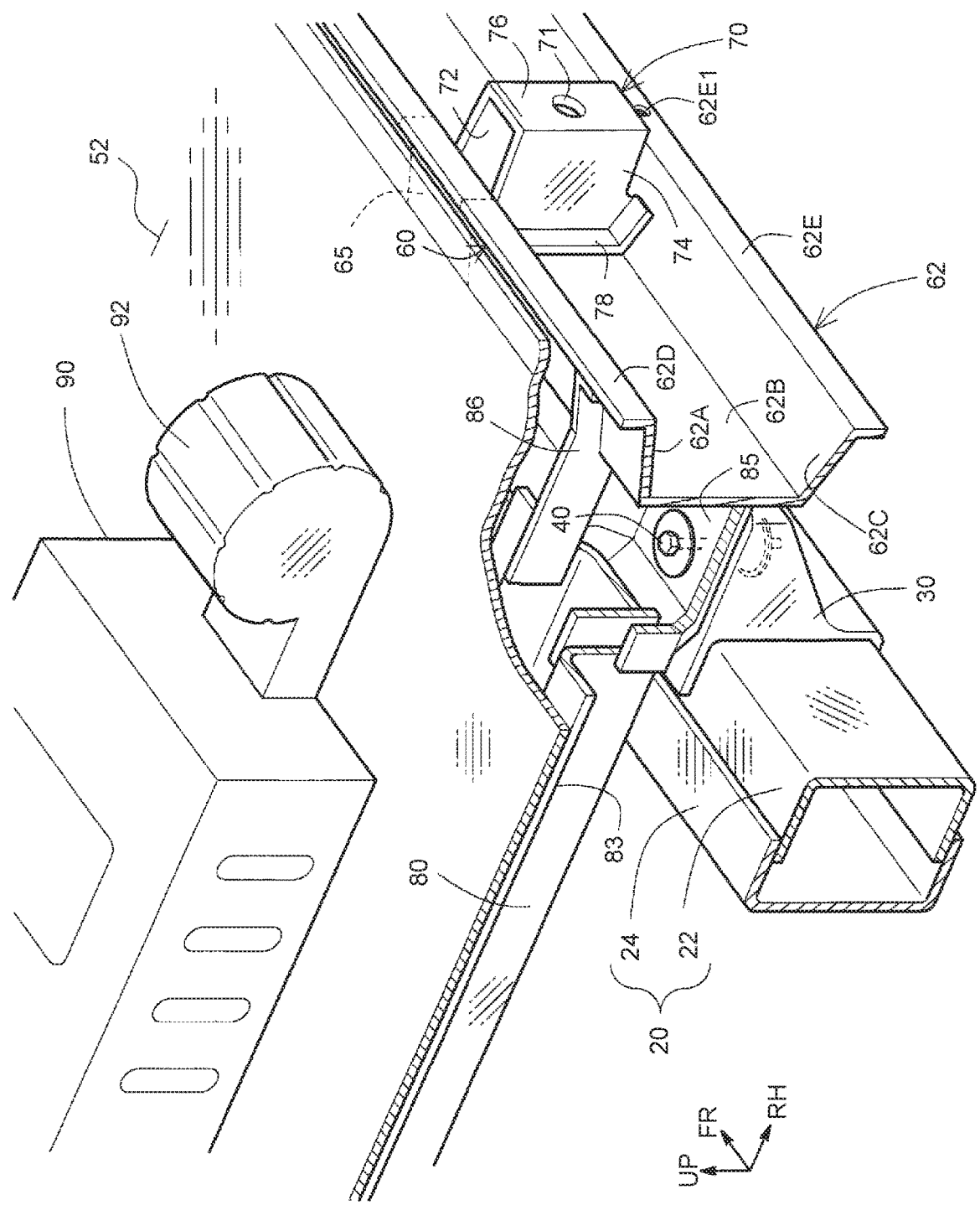
FIG. 5 is a perspective view showing a rocker with an outer rocker part removed.

Referring to FIG. 5, the brace 70 that is a reinforcing member is housed inside the rocker 60 having a closed cross-sectional shape. The brace 70, the battery 90, and the cooling blower 92 that is a battery accessory are disposed in a straight line in a lateral direction, in other words, in a row in the vehicle width direction. Specifically, the brace 70 is housed in a battery flanking portion 65 of the rocker 60 that is a portion corresponding to the cooling blower 92 in position in the vehicle front-rear direction.

The brace 70 has, for example, a hat-shaped cross-section in an FR-RH plane, and includes a front wall 72, a rear wall 74, a side wall 76, and a flange 78. The front wall 72 and the rear wall 74 are disposed facing the vehicle front side and the vehicle rear side, respectively. Both the front wall 72 and the rear wall 74 extend along a UP-RH plane. The side wall 76 connects outer ends of the front wall 72 and the rear wall 74 in the vehicle width direction to each other. The side wall 76 is disposed on the outer side in the vehicle width direction and extends along a UP-FR plane. The flange 78 is connected to inner ends of the front wall 72 and the rear wall 74 in the vehicle width direction.

The brace 70 is mounted on the inner rocker part 62. For example, the flange 78 of the brace 70 is welded to the side wall 62B of the inner rocker part 62.

Figure 6:
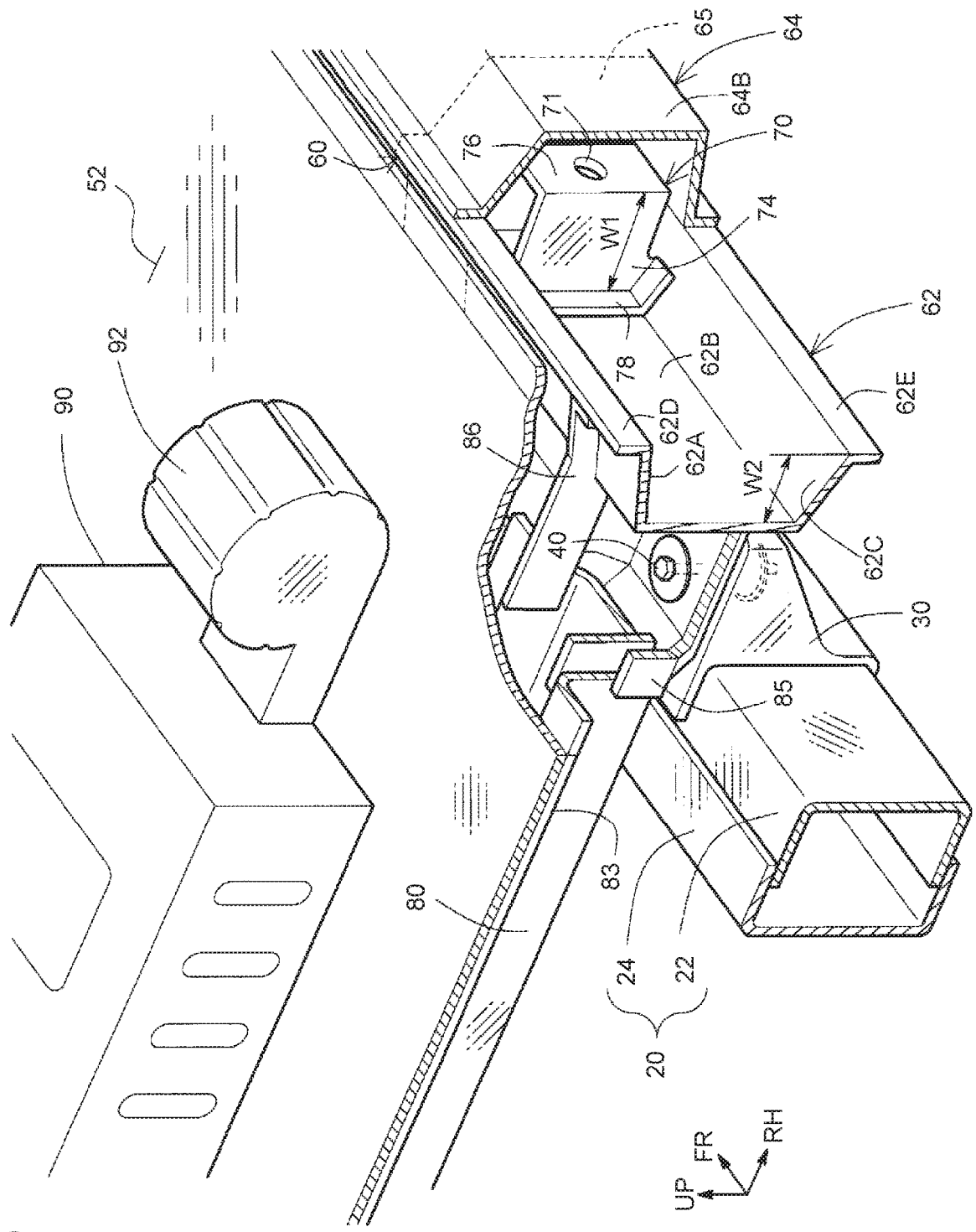
FIG. 6 is a perspective view illustrating the positional relationship between a brace and the outer rocker part.

Referring to FIG. 4 and FIG. 6, the brace 70 protrudes outward in the vehicle width direction beyond the inner rocker part 62. For example, a length W1 of the brace 70 in the vehicle width direction exceeds a length W2 of the inner rocker part 62 in the vehicle width direction. Since the brace 70 protrudes outward in the vehicle width direction beyond the inner rocker part 62, crushing deformation of the outer rocker part 64 in a pole side-impact collision to be described later can be stopped early.

The length W1 of the brace 70 in the vehicle width direction may be shorter than a separation distance W3 (see FIG. 4) from the side wall 62B of the inner rocker part 62 to the side wall 64B of the outer rocker part 64. This means that the side wall 76 of the brace 70 and the side wall 64B of the outer rocker part 64 may be separated from each other.

Referring to FIG. 1, a length L1 of the brace 70 in the vehicle front-rear direction may be equal to or shorter than a length L2 in the vehicle front-rear direction of the cooling blower 92 that is a battery accessory. The brace 70 is provided to restrict crushing deformation of the outer rocker part 64 and facilitate early breakage of the mount bolt 40. For portions of the rocker 60 at which such early breakage is not required, e.g., portions away from the lateral side of the battery 90, the brace 70 is not provided to allow the outer rocker part 64 to undergo crushing deformation and thereby absorb an impact load.

To accurately dispose such a small-width brace 70 in the battery flanking portion on the side of the cooling blower 92, the inner rocker part 62 and the brace 70 are each provided with a positioning reference point. For example, referring to FIG. 5, a reference hole 62E1 is formed as a reference point in the flange 62E of the inner rocker part 62 so as to extend therethrough in a thickness direction, and a reference hole 71 is formed as a reference point in the side wall 76 of the brace 70 so as to extend therethrough in a thickness direction.

The reference hole 62E1 of the inner rocker part 62 is formed in the battery flanking portion 65 of the rocker 60. When installing the brace 70 onto the inner rocker part 62, the reference hole 71 of the brace 70 and the reference hole 62E1 of the inner rocker part 62 are aligned with each other. For example, the brace 70 is welded to the inner rocker part 62 with the reference hole 62E1 and the reference hole 71 aligned in an up-down direction. Thus, the brace 70 can be accurately disposed relatively to the cooling blower 92.

Given the short length L1 (see FIG. 1) of the brace 70 in the vehicle front-rear direction, which is, for example, equal to or shorter than the length L2 of the cooling blower 92 in the vehicle front-rear direction, a reference point for positioning the brace 70 (e.g., the reference hole 62E1) may be provided in only the inner rocker part 62 that is elongated in the vehicle front-rear direction.

Load Transmission in Pole Side-Impact Collision

Figure 7:
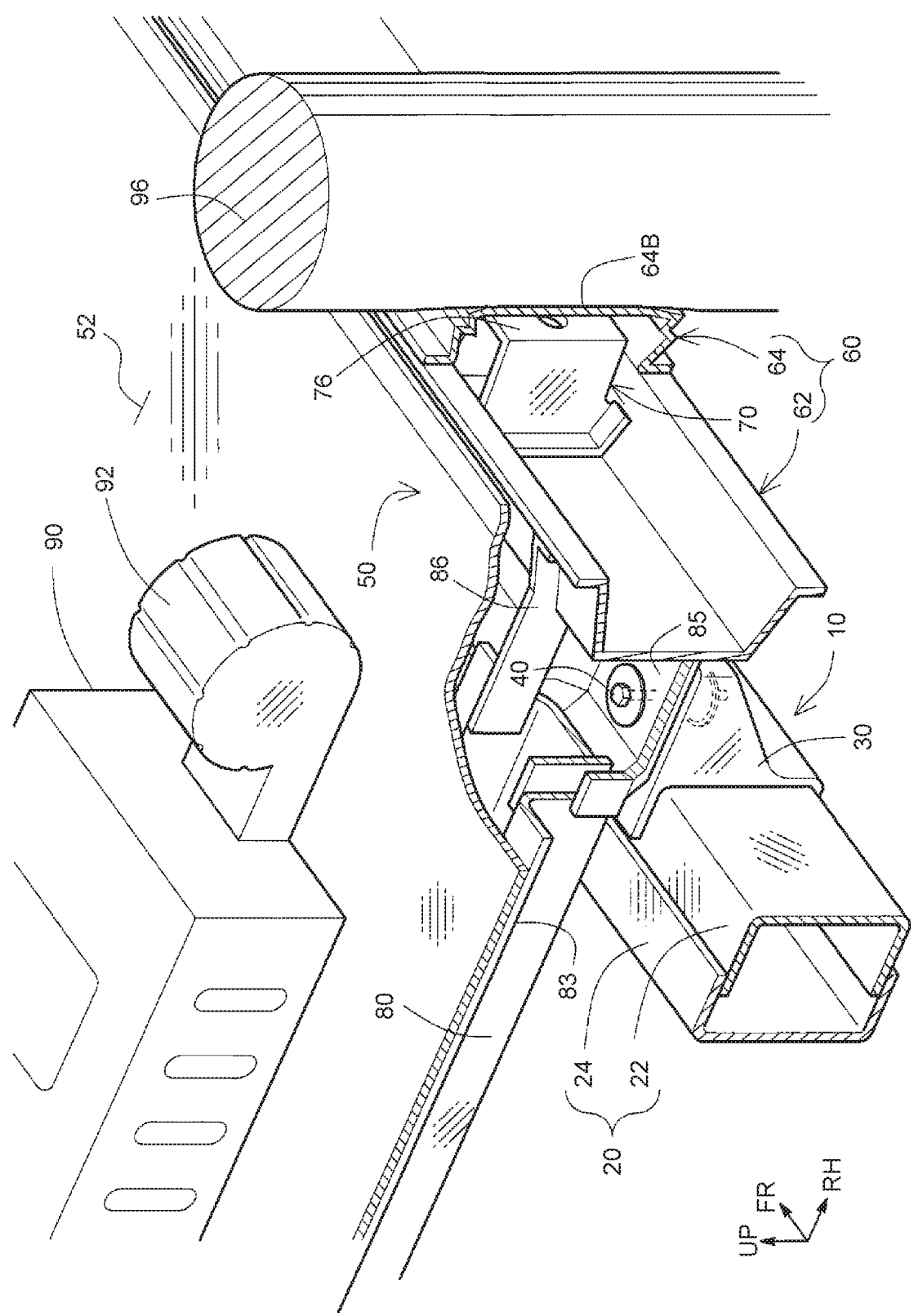
FIG. 7 is a perspective view illustrating a state of the vehicle lower structure according to the embodiment in a pole side-impact collision.
Figure 8:
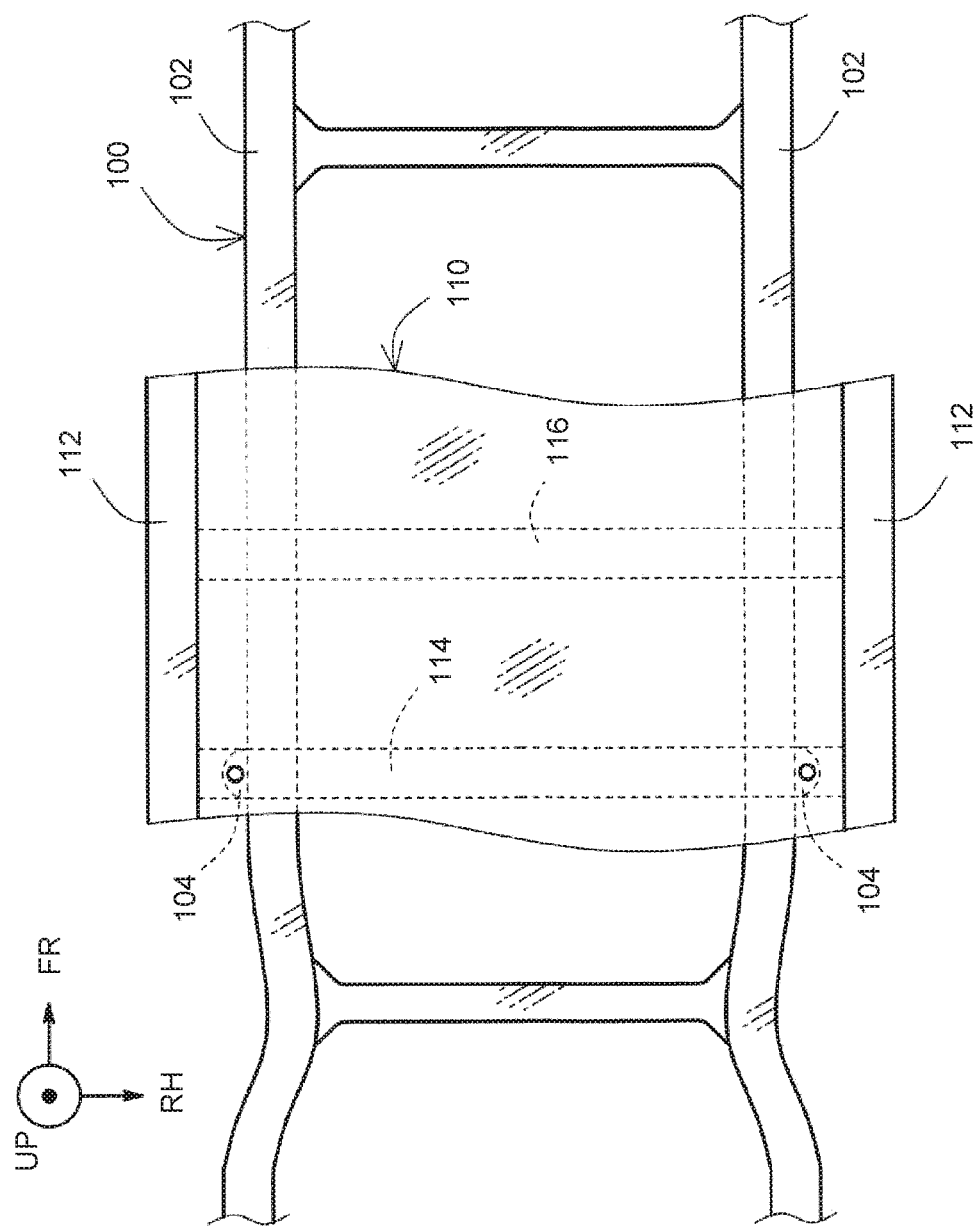
FIG. 8 is a plan view illustrating a vehicle lower structure according to a related art.
Figure 9:
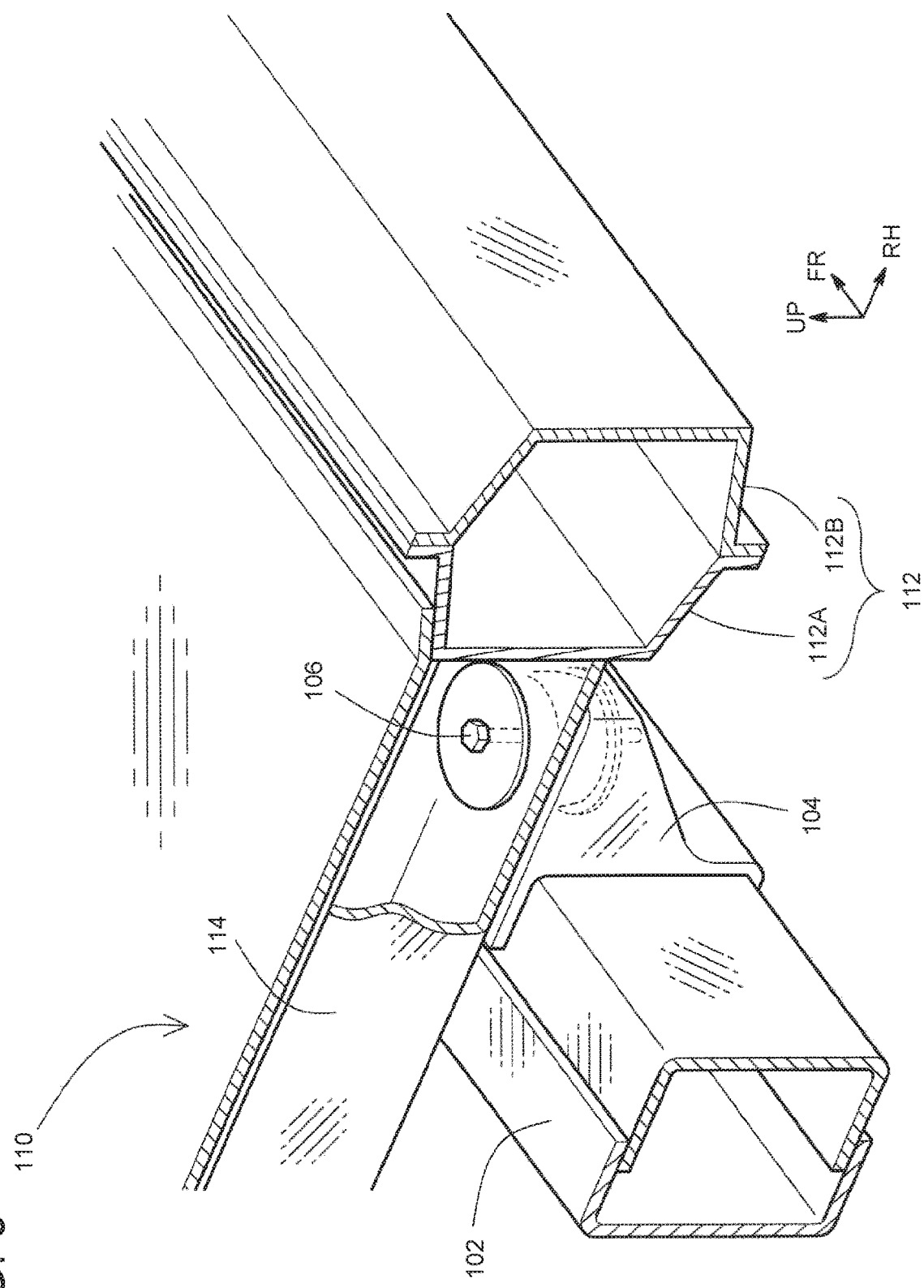
FIG. 9 is a perspective view illustrating a structure around a body mount in the vehicle lower structure according to the related art.
Figure 10:
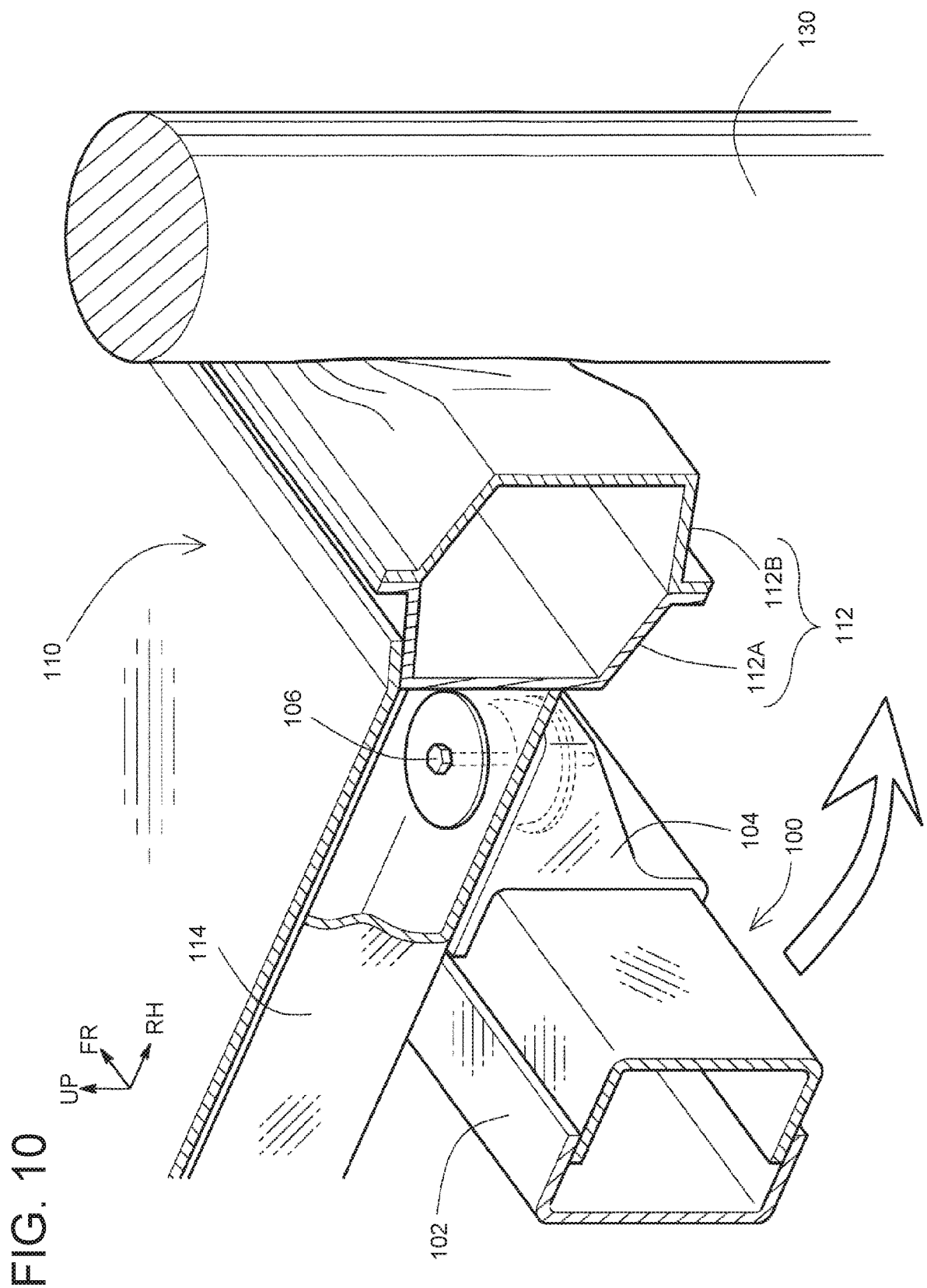
FIG. 10 is a perspective view illustrating a state of the vehicle lower structure in a pole side-impact collision.

FIG. 7 illustrates a state of the vehicle lower structure according to the embodiment in a pole side-impact collision. Suppose that the vehicle slides sideways while running along a curve and a side surface of the vehicle collides with the pole 96, such as a roadside utility pole (pole side-impact collision). In this case, when the battery flanking portion 65 (see FIG. 6) of the rocker 60 collides with the pole 96, due to the short distance between the cooling blower 92 and the rocker 60, the pole 96 may reach the cooling blower 92 soon after intruding into the vehicle cabin, and the collision load may be transmitted to the battery 90.

To prevent this, the vehicle lower structure according to the embodiment allows the mount bolt 40 to break quickly at an early stage of a pole side-impact collision and thereby disconnects the body 50 from the ladder frame 10 (see FIG. 1).

Since the brace 70 is housed in the battery flanking portion 65 of the rocker 60, when the battery flanking portion 65 collides with the pole 96, crushing deformation of the outer rocker part 64 inward in the vehicle width direction is stopped by the brace 70.

Thus, the collision load is transmitted from the rocker 60 to the first body cross-member 80 through the outer bracket 85 and the inner bracket 86 with load absorption through crushing deformation of the outer rocker part 64 restricted. This allows the mount bolt 40 fastening together the first body cross-member 80 and the body mount 30 on the side opposite from the impacted side to break quickly compared with when the brace 70 is not provided and crushing deformation of the outer rocker part 64 is not restricted. As a result, the body 50 is disconnected from the ladder frame 10 and the inertial mass of the body 50 is reduced compared with that of the combined body of the ladder frame 10 and the body 50, so that the inertial force is reduced accordingly and the intrusion of the pole 96 into the vehicle cabin is restricted.

What is claimed is:

1. A vehicle lower structure in which a vehicle body is installed on a ladder frame that is a framework member,
   the ladder frame including
   a pair of left and right side rails extending in a vehicle front-rear direction, and
   body mounts respectively mounted on the side rails,
   the body including, as framework members
   a pair of left and right rockers that is provided at both ends in a vehicle width direction, outward of the pair of side rails in the vehicle width direction, and extends in the vehicle front-rear direction, and
   a first body cross-member extending in the vehicle width direction so as to be suspended between the pair of rockers, wherein:
   the first body cross-member is disposed on the body mounts and fixed to the body mounts through fastening members;
   a battery and a battery accessory provided on an outer side of the battery in the vehicle width direction are installed on the body, between the pair of rockers; and
   the rockers have a closed cross-sectional structure, and a brace that is a reinforcing member is housed in a battery flanking portion of each of the rockers that is a portion corresponding to the battery accessory in position in the vehicle front-rear direction.

2. The vehicle lower structure according to claim 1, wherein a length of the brace in the vehicle front-rear direction is equal to or shorter than a length of the battery accessory in the vehicle front-rear direction.

3. The vehicle lower structure according to claim 1, wherein a reference point for positioning the brace is provided in the battery flanking portion of the rocker.

4. The vehicle lower structure according to claim 1, wherein:
- the body has, in addition to the first body cross-member fixed to the body mounts, a second body cross-member that is provided frontward of the first body cross-member and extends in the vehicle width direction so as to be suspended between the pair of rockers; and
- the battery and the battery accessory are disposed closer to the first body cross-member than to the second body cross-member.

* * * * *